July 3, 1956  P. MUCHNICK  2,753,514
VOLTAGE REGULATOR
Filed Aug. 8, 1955

PAUL MUCHNICK
INVENTOR

BY Ralph E. Bitner
ATTORNEY

United States Patent Office 2,753,514
Patented July 3, 1956

2,753,514

VOLTAGE REGULATOR

Paul Muchnick, New York, N. Y., assignor to Sorensen & Company, Incorporated, a corporation of Connecticut Application August 8, 1955, Serial No. 526,878

5 Claims. (Cl. 323—66)

This invention relates to a voltage regulator for alternating current and has particular reference to a means for absorbing the higher harmonics generated in the regulating components.

The most general form of an alternating current voltage regulator includes a saturable reactor coupled between an alternating current supply line and the load circuit. The reactance of the saturable reactor is varied by a direct current control winding which is supplied by an amplifying circuit coupled to a sensing device which is responsive to the voltage variations across the load circuit. Since the saturable reactor employs a core which varies in saturation a number of harmonics are added to the applied alternating current and the wave shape may be considerably distorted.

The present invention absorbs the third harmonic generated by a saturable reactor by impressing a similar voltage across the terminals of the saturable reactor while at the same time presenting the fundamental frequency voltage in a phase relation which aids the supply voltage. It is not necessary to make any allowance or correction for the second harmonic since this type of distortion is eliminated by a balancing arrangement in the saturable reactor itself, leaving only the third, fifth, and other odd harmonics in the resultant wave.

One of the objects of this invention is to provide an improved voltage regulator which avoids one or more of the disadvantages and limitations of prior art arrangements.

Another object of the invention is to provide a simple and inexpensive circuit which will absorb the third harmonic generated by a saturable reactor.

Another object of the invention is to improve the characteristics of alternating current voltage regulators by producing a purified wave from across the load circuit.

Another object of the invention is to reduce the weight of voltage regulators by eliminating heavy filter circuits.

Another object of the invention is to provide a circuit means for eliminating the third harmonic from voltage regulators which is operable over a wide range of frequencies and does not depend upon any resonant phenomenon.

The invention includes the usual saturable reactor connected in series between an input and an output terminal and may be employed with or without an autotransformer. A connecting transformer has its primary connected across the load in series with a small inductor. The secondary of this transformer is connected across the terminals of the saturable reactor in series with the same inductor. The transformer is connected so that the fundamental wave voltage across the saturable reactor has the same phase angle and voltage value as the wave supplied by the secondary of the correcting transformer. For this reason there is no circulating current and no absorption of the fundamental wave. The third harmonic generated by the saturable reactor aids the third harmonic supplied by the secondary of the transformer and a large circulating current is produced which absorbs the energy of this component.

For a better understanding of the present invention, together with other and further objects thereof, reference is made to the following description taken in connection with the accompanying drawings.

Figure 1:
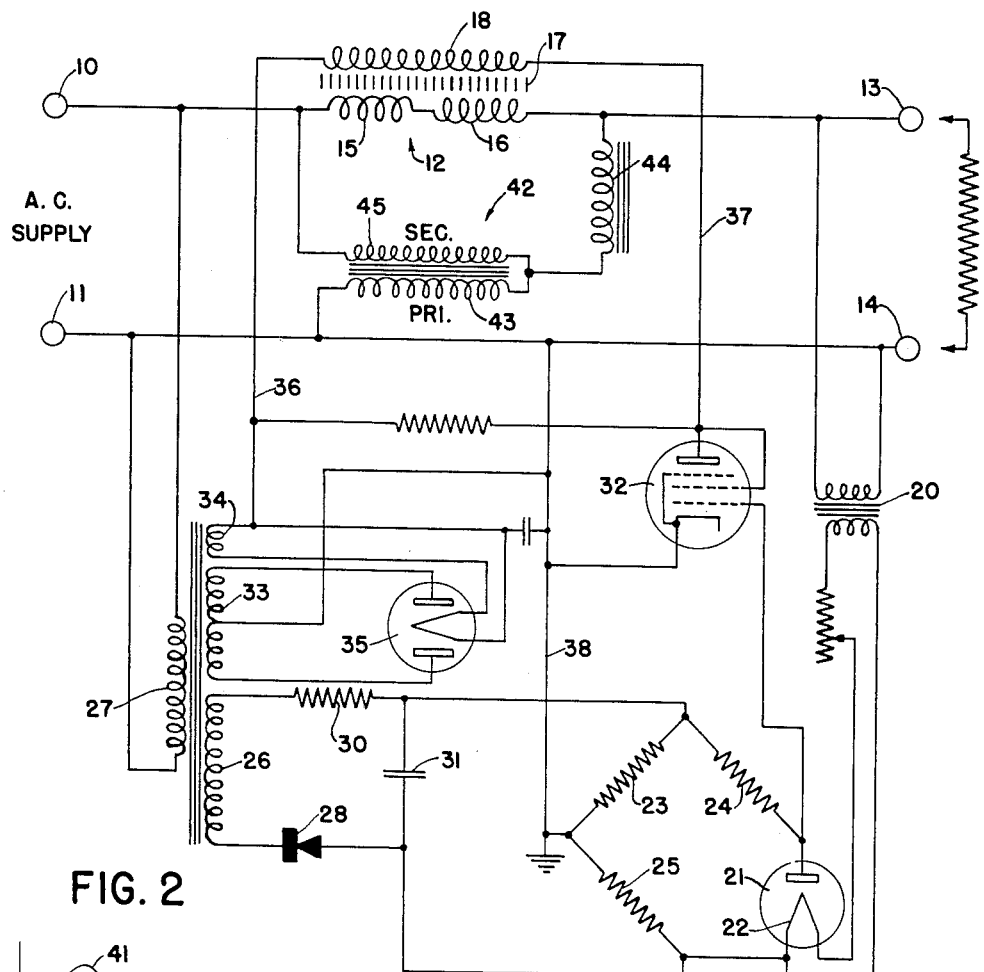
Fig. 1 is a schematic diagram of connections of the voltage regulator.

Referring now to the drawings, the circuit of the voltage regulator is shown in Fig. 1 and includes a pair of input terminals 10, 11, which are to be connected to an alternating current supply line. A saturable reactor 12 is connected in series between terminal 10 and an output terminal 13. Input terminal 11 is connected directly to an output terminal 14. The saturable reactor includes two windings 15 and 16 wound on a core 17 which can easily be saturated. A direct current control winding 18 is also wound on the saturable core and controls the degree of saturation.

In order to determine the value of the output voltage a sensing circuit is connected across the load terminals 13 and 14. This may include a step-down transformer 20, a filamentary diode 21 having a tungsten filament 22, and a four-armed bridge circuit which includes the filamentary diode 21 and three resistors 23, 24, and 25. The bridge and the filamentary diode are supplied with direct current by a rectifying circuit which includes the secondary 26 of a transformer whose primary 27 is connected to the alternating current supply line. The rectifying circuit also includes a rectifier 28, a resistor 30, and a capacitor 31. This supply circuit is connected to opposite junction points in the bridge.

The other two junction points in the bridge circuit are connected to the cathode and control electrode of a pentode amplifier tube 32 which amplifies the signal derived from the bridge circuit. Pentode 32 is supplied with anode current by a rectifier circuit which includes secondary windings 33 and 34 connected to a double rectifier tube 35. The anode circuit for pentode 32 may be traced from the positive portion of the rectifier circuit over conductor 36, through winding 18, over conductor 37, to the anode-cathode circuit in the tube, to ground conductor 38 and the negative portion of the rectifier circuit.

Figure 2:
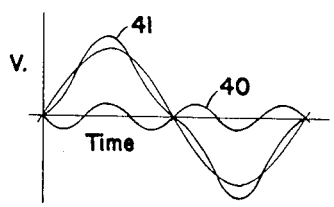
Fig. 2 is a graph showing the distorted wave generated by the saturable reactor.
Figure 3:
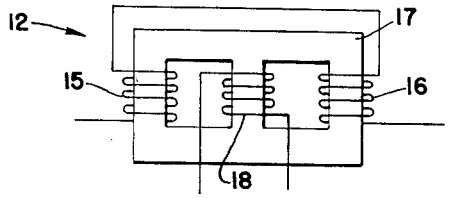
Fig. 3 is a schematic diagram of the saturable reactor indicating the method of balancing out the second harmonic.

The above described components of an alternating current voltage regulator are old in the art and have been described and claimed in other patents. Such a circuit generates a pronounced third harmonic 40 as illustrated in Fig. 2 and generally results in a distorted output wave similar to wave 41. In order to correct for this distortion, a correction transformer 42 is connected in the circuit as indicated, with the primary winding 43 connected across the load terminals in series with a small inductor 44. The secondary winding 45 of this transformer is connected across the alternating current windings 15, 16, of the saturable reactor in series with the same inductor 44.

This circuit operates as follows: Assuming a pure sine wave applied at the input terminals, the voltage measured across the end terminals of the saturable reactor coils 15 and 16 is indicated by curve 41 of Fig. 2. This voltage drop in conjunction with the supply voltage is impressed on the load attached to terminals 13 and 14 and this same voltage is applied to the primary winding 43 and the reactor 44. The fundamental voltage wave across primary winding 43 has been given a slight phase shift as compared to the voltage across windings 15 and 16 but the third harmonic is shifted considerably more because each reactance value is multiplied by three. Transformer 42 reverses the voltage and applies a fundamental wave to windings 15 and 16 which is in opposition to the voltage drop of the fundamental and no appreciable circulating current results.

The third harmonic, however, has been shifted in phase so that the voltage across winding 45 aids the voltage across windings 15 and 16 and a large circulating current results, eliminating the third harmonic from the system and transmitting only the fundamental to the output terminals 13 and 14. It will be obvious that this system is a "self-quenching" circuit and a third harmonic must be available at the output terminals before the third harmonic can be eliminated from the saturable reactor. It has been found by experiment that such an arrangement reduces the harmonic distortion to 4 percent when, without it, the distortion would have been 32 percent.

It will be obvious from the above description that a balanced saturable core reactor is required but the sensing and amplifying circuits may be changed to other forms and other components.

While there have been described and illustrated specific embodiments of the invention, it will be obvious that various changes, modifications, and additions can be made therein without department from the field of the invention which should be limited only by the scope of the appended claims.

I claim:

1. An alternating current voltage regulator comprising, a saturable core reactor connected in a circuit between a pair of input terminals and a pair of output terminals for varying the impedance of said circuit, a control winding on said reactor core for connection to a direct current source which varies the saturation of said core to maintain a constant voltage at the output terminals, and a transformer for reducing wave distortion generated by the saturable core reactor, said transformer having its primary winding connected across the output terminals in series with an impedance and its secondary winding connected across the reactor windings in series with said impedance.

2. An alternating current voltage regulator comprising, a saturable reactor connected in a circuit between a pair of input terminals and a pair of output terminals for varying the impedance of said circuit, a control winding on said reactor core, a transformer for reducing wave distortion generated by the saturable core reactor, said transformer having its primary winding connected across the output terminals in series with an impedance and its secondary winding connected across the reactor windings in series with said impedance, a sensing circuit connected to the output terminals for determining variations in output voltage, and a direct current amplifier circuit connected between the sensing circuit and said control winding on the reactor core for varying the saturation of the core to maintain a constant voltage at the output terminals.

3. An alternating current voltage regulator in accordance with claim 2 wherein said impedance includes a reactor.

4. An alternating current voltage in accordance with claim 2 wherein said sensing circuit includes a diode having a filamentary cathode, said cathode coupled to the output terminals.

5. An alternating current voltage regulator in accordance with claim 4 wherein said diode is connected as one arm of a four-arm Wheatstone bridge.

No references cited.